B. JANSON.
Improvement in Velocipedes.
No. 115,212. Patented May 23, 1871.
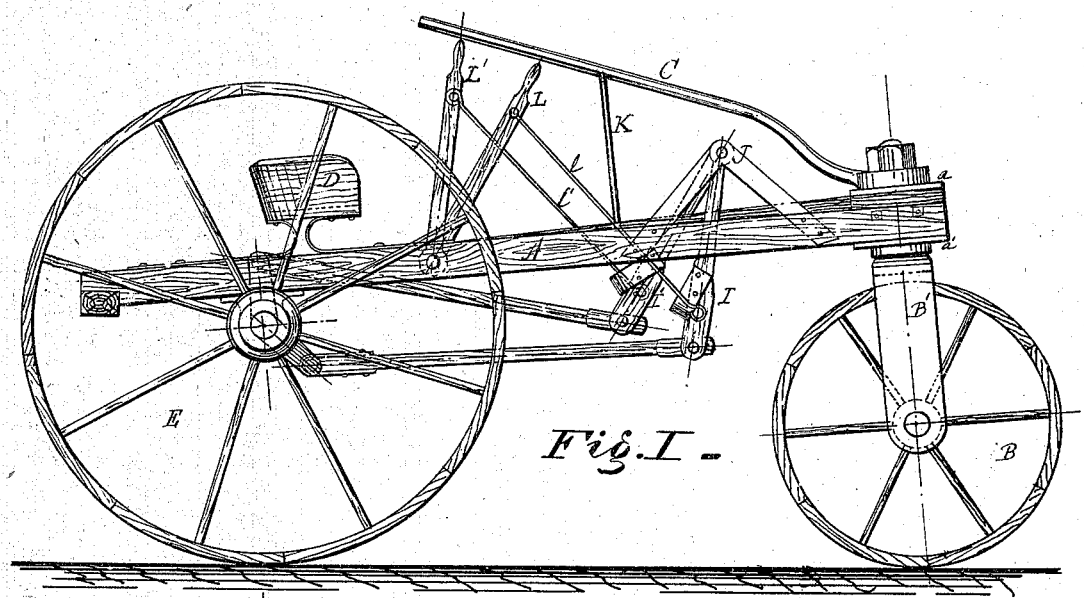
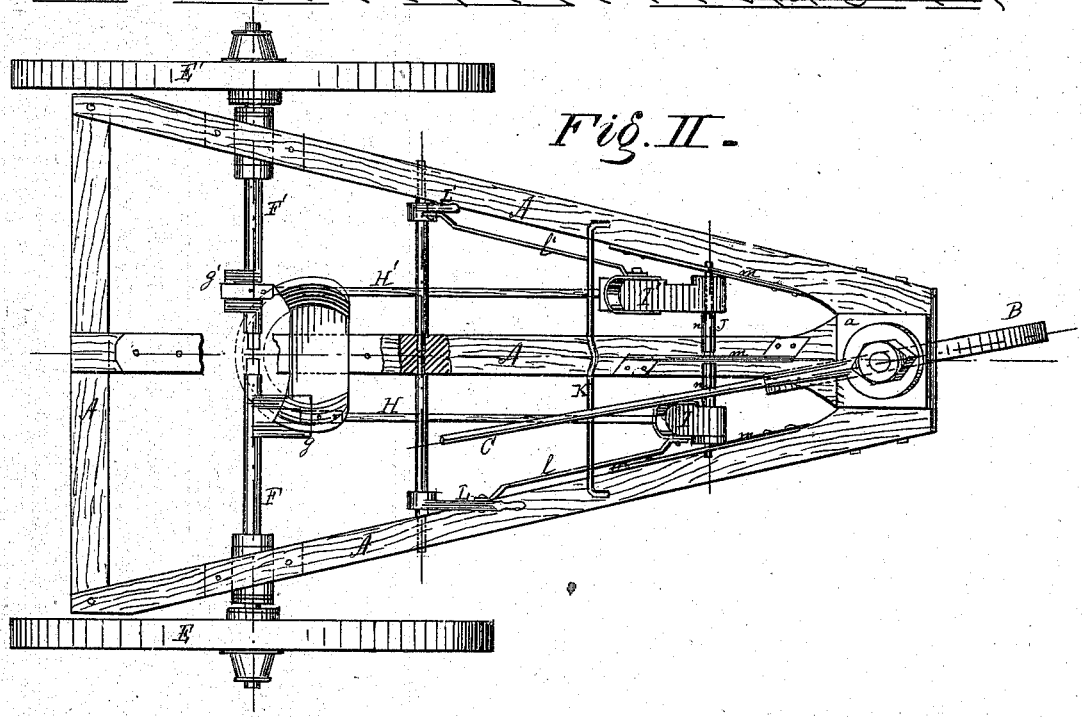
Witnesses:
Inventor:
Bernhard Janson
By
Hill & Ellsworth
Attys.

UNITED STATES PATENT OFFICE.

BERNHARD JANSON, OF EFFINGHAM, ILLINOIS.

IMPROVEMENT IN VELOCIPEDES.

Specification forming part of Letters Patent No. 115,212, dated May 23, 1871.

*To all whom it may concern:*

Be it known that I, BERNHARD JANSON, of Effingham, in the county of Effingham and State of Illinois, have invented a new and Improved Velocipede; and I do hereby declare the following to be a full, clear, and exact description of the same, reference being had to the accompanying drawing forming part of this specification, in which—

Figure 1 is a side view, and Fig. 2 a plan, a portion of the central beam of the frame having been broken away to show the disconnection of the two parts of the rear axle.

Similar letters of reference in the accompanying drawing denote corresponding parts.

This invention relates to the class of three-wheeled velocipedes; and it consists, first, in the construction of the rear axle, as hereinafter described; and, secondly, in the general arrangement and combination of the parts constituting the whole vehicle.

In the drawing, A is the frame, which is triangular in shape, consisting of three longitudinal beams, united at their forward end by means of top and bottom plates $a$ $a^1$ and lateral bolts $a^2$ $a^2$, and at their rear end by means of a cross-beam. B is the forward or guiding wheel, capable of being turned to the right or left by means of a swiveling-frame, B', and a hand-lever, C. D is the driver's seat. E E' are the two hind wheels, affixed to separate axles F F', or to an axle made in two parts, working independently of each other, and each provided with a crank, $g$ $g'$. H H' are pitmen, connecting said cranks to a swinging treadle, I I'. J is the frame supporting said treadles, it being composed of triangular pieces of metal, $m$ $m$ $m$, fastened to the several longitudinal beams of the frame, and connected at their upper angle by a metallic rod, $n$. L L' are hand-levers for operating the wheels, each lever being connected to the treadles by means of a rod, $l$ $l'$; and K is a rest for the lever C, and is provided with one or more notches to hold said lever in the different positions required.

The carriage may be provided with a floor and a cover or top, if preferred, and it may be made with three or four wheels.

The great advantages resulting from this improved construction of velocipedes are, first, its adaptation to the application of both hand and foot power at once by means of the same treadle, the hand-levers being connected to the treadles, so that the power of both hand and foot is combined and then applied through a single pitman on each side of the carriage; this arrangement causes the wheels to be worked more evenly and uniformly, and at the same time enables the operator to apply the power more conveniently and with less fatigue; secondly, the fact that the rear wheels and axles are made to work independently of each other, so that one can be stopped while the other is in motion, or one can be moved backward while the other is moved forward, and the carriage thus be actually turned round on the ground which it would cover when standing still; and thirdly, the compactness, lightness, and strength which result from the general construction, as shown and described.

Having thus described my invention, what I claim as new therein, and desire to secure by Letters Patent, is—

In a velocipede, the arrangement of two driving-wheels turning on independent axles, worked by power applied through separate and independent levers and pendent treadles, as herein described, for the purpose specified.

BERNHARD JANSON.

Witnesses:
  N. K. ELLSWORTH,
  A. RAWLINGS.